US012774049B2

(12) United States Patent
Olsson et al.

(10) Patent No.: US 12,774,049 B2
(45) Date of Patent: Oct. 27, 2026

(54) IDLER ARRANGEMENT FOR A TRACK ASSEMBLY, AND METHOD FOR OPERATING SAID IDLER ARRANGEMENT

(71) Applicant: Komatsu Forest AB, Umeå (SE)

(72) Inventors: Adam Olsson, Umeå (SE); Olof Noréus, Umeå (SE)

(73) Assignee: KOMATSU FOREST AB, Umeå (SE)

( * ) Notice: Subject to any disclaimer, the term of this patent is extended or adjusted under 35 U.S.C. 154(b) by 407 days.

(21) Appl. No.: 18/001,042

(22) PCT Filed: Jun. 16, 2021

(86) PCT No.: PCT/EP2021/066284
§ 371 (c)(1),
(2) Date: Dec. 7, 2022

(87) PCT Pub. No.: WO2021/255116
PCT Pub. Date: Dec. 23, 2021

(65) Prior Publication Data

US 2023/0219643 A1 Jul. 13, 2023

(30) Foreign Application Priority Data

Jun. 16, 2020 (SE) .................................... 2050726-5

(51) Int. Cl.
*B62D 55/116* (2006.01)
*B62D 55/065* (2006.01)
*B62D 55/30* (2006.01)

(52) U.S. Cl.
CPC ........ *B62D 55/116* (2013.01); *B62D 55/0655* (2013.01); *B62D 55/305* (2013.01)

(58) Field of Classification Search
CPC ......... B62D 55/305; B62D 55/30; G01L 5/10; B60G 17/0152; B60G 2202/15; B60G 17/04

(Continued)

(56) References Cited

U.S. PATENT DOCUMENTS 3,306,250 A * 2/1967 Pitchford .............. B60F 3/0015 440/12.54
3,360,063 A 12/1967 Hausenblas et al.
(Continued)

FOREIGN PATENT DOCUMENTS

CN 108715192 10/2018
DE 1580585 11/1975
(Continued)

OTHER PUBLICATIONS

Translation of KR-101930066-B1 with Paragraph numbers added for convenience (Year: 2025).*
(Continued)

*Primary Examiner* — John Olszewski
*Assistant Examiner* — Nathaniel William Watkins
(74) *Attorney, Agent, or Firm* — Fox Rothschild LLP; Carol E. Thorstad-Forsyth

(57) ABSTRACT

The present invention relates to an idler arrangement (80) for maintaining the desired tension in an endless track (34), said endless track (34) is part of a track assembly (30) comprising a track support beam (31), track road wheels (32) and at least one sprocket (33) arranged to drive the endless track (34) arranged around the track road wheels (32) and the sprocket (33), said idler arrangement (80) comprising: an idler wheel (35); an idler wheel support (81) fitted to the track support beam (31) and configured such that the idler wheel is movably arranged in relation to the support beam; a control unit (70); idler wheel position adjusting means operated by the control unit and arranged to position the idler wheel (35) in a desired position: and means for determine a requested torque to be applied by the sprocket and forwarding the determined information to the control unit, wherein the control unit is configured to operate the idler wheel position adjusting means to maintain, or adjust, (Continued)

the position of the idler wheel (35), based on a requested torque applied by the sprocket (33), to maintain the desired tension in the endless track (34). The invention furthermore relates to a method for operating the idler arrangement (80).

17 Claims, 7 Drawing Sheets

(58) Field of Classification Search
USPC .......................................................... 180/9.52
See application file for complete search history.

(56) References Cited

U.S. PATENT DOCUMENTS

| | | | | |
|---|---|---|---|---|
| 4,840,437 | A | 6/1989 | Henry et al. | |
| 5,097,916 | A * | 3/1992 | Brandstadter .......... | B60G 17/04<br>180/41 |
| 5,378,204 | A | 1/1995 | Urvoy | |
| 7,866,420 | B1 * | 1/2011 | Claas ..................... | B62D 55/30<br>180/9.1 |
| 2005/0029866 | A1 * | 2/2005 | Tamaru ................ | B62D 55/305<br>305/125 |
| 2014/0144716 | A1 * | 5/2014 | Wirkus .................. | B62D 55/30<br>180/9.1 |
| 2014/0265549 | A1 * | 9/2014 | Anderfaas ............ | B62D 55/305<br>305/145 |
| 2018/0043947 | A1 * | 2/2018 | Brazier .................. | B62D 55/04 |
| 2018/0118291 | A1 * | 5/2018 | Sauvageau ........... | B62D 55/305 |
| 2018/0237020 | A1 * | 8/2018 | Lussier ................. | B60W 40/10 |
| 2020/0114992 | A1 * | 4/2020 | Edelin .................. | B62D 55/305 |

FOREIGN PATENT DOCUMENTS

| | | | | |
|---|---|---|---|---|
| DE | 4412552 | | 9/2004 | |
| DE | 102017002163 | | 9/2018 | |
| JP | 2000168641 | A * | 6/2000 | |
| KR | 101930066 | B1 * | 12/2018 | ............. B65G 23/44 |
| WO | WO-2020049526 | A2 * | 3/2020 | ............. B62D 55/14 |

OTHER PUBLICATIONS

Merged original document (JP 2000168641) with English translation. (Year: 2025).*

Merged original document with English translation (KR 101930066); paragraphs added for citation purposes. (Year: 2025).*

Merged original document with English translation (KR 101930066); Paragraphs added for citations. (Year: 2025).*

Merged original document with English translation (JP 2000168641). (Year: 2026).*

International Search Report and Written Opinion mailed Aug. 26, 2021 in corresponding International Application No. PCT/EP2021/066284 (16 pages).

* cited by examiner

IDLER ARRANGEMENT FOR A TRACK ASSEMBLY, AND METHOD FOR OPERATING SAID IDLER ARRANGEMENT

CROSS REFERENCE TO RELATED APPLICATIONS

This application is a U.S. National Phase Application of PCT International Application No. PCT/EP2021/066284 which was filed on Jun. 16, 2021 and claims the benefit of priority to Swedish Patent Application No. 2050726-5 which was filed on Jun. 16, 2020. The entire contents of these applications are herein incorporated by reference.

FIELD OF THE INVENTION

The present invention relates to an idler arrangement for maintaining the desired tension in an endless track that is part of a track assembly comprising a track support beam, track road wheels and at least one sprocket arranged to drive the endless track arranged around the track road wheels and the sprocket, and a method for operating the idler arrangement.

TECHNICAL BACKGROUND

Different types of vehicles are frequently used within different areas to conduct work and moving equipment, products etc. One example is within the forest industry where powerful vehicles are used for harvesting and transporting cut down trees from the forest.

Some vehicles intended for use for example within the forest area are provided with track assemblies arranged to propel the vehicle. The track assemblies are able to withstand high loads and improve the vehicle abilities to drive in rough conditions. The track assemblies could have different configurations, but all involves an endless track extending around at least one sprocket and a number of track road wheels. The track assemblies preferably also comprise a track tensioning wheel, also referred to as an idler, arranged to maintain the desired tension in the endless track even though the running conditions may change. For example, the tractive force applied by the sprocket may vary to change the speed of the vehicle, alternatively changing ground conditions could result in that the tension in parts of the endless track is reduced or increased, which could affect the performance of the track assembly. In worst case, if the tension is to low, the endless track could be forced off the track road wheels.

One example of an arrangement for maintaining the desired track tension available today is presented in CA 2 982 293. The track system presented comprises a dynamic tensioning device in which determined accelerations or deaccelerations are used to control the idler.

However, there is still a need for a further improved idler arrangement that ensures that the desired tension in the endless track is maintained even though the running conditions may change.

SUMMARY

It would be advantageous to achieve an arrangement that at least is alleviating some of the above-mentioned drawbacks. To better address one or more of these concerns an idler arrangement for maintaining the desired tension in an endless track according to claim 1 is presented. Preferred embodiments of the vehicle and method are defined in the dependent claims.

The idler arrangement for maintaining the desired tension in an endless track that is part of a track assembly comprising a track support beam, track road wheels and at least one sprocket arranged to drive the endless track arranged around the track road wheels and the sprocket, said idler arrangement comprising:

an idler wheel;

an idler wheel support fitted to the track support beam and configured such that the idler wheel is movably arranged in relation to the support beam;

a control unit;

idler wheel position adjusting means operated by the control unit and arranged to position the idler wheel in the desired position: and means for determine a requested torque to be applied by the sprocket and forwarding the determined information to the control unit, wherein the control unit is configured to operate the idler wheel position adjusting means to maintain, or adjust, the position of the idler wheel, based on a requested torque applied by the sprocket, to maintain the desired tension in the endless track.

Changes in requested torque applied by the sprocket is for example generated by changed propulsion speed of the vehicle, changing running conditions like for example driving direction, i.e. forward or reverse direction, and the vehicle load. The idler arrangement according to the invention is favourable since the information regarding the requested torque applied by the sprocket is provided to the control unit and used as a parameter to control the idler wheel position adjusting means. The position of the idler wheel is adjusted to the desired position, or maintained in the desired position, to ensure the desired tension in the endless track which is essential to achieve the best possible performance of the track assembly. Furthermore, the arrangement according to the invention makes it possible to activate the adjustment of the idler wheel position even before a change in track tension is noticed and thereby reduce variations in the track tension as well as the risk for detracking.

Furthermore, maintaining optimal track tension during different driving conditions reduces energy consumption and mechanical wear on the different component within the track assembly, and improves the comfort in the vehicle as well as the impact on the ground under the tracks.

In one embodiment of the idler arrangement, idler wheel is movable between a first and a second end position, said first end position is arranged closer to the track support beam than the second position and the tension in the endless track is reduced when the idler wheel is moved towards the first end position and increased when the idler wheel is moved towards the second position.

In one embodiment of the idler arrangement, the idler wheel is resiliently supported in the idler wheel support to provide a smooth interaction with the endless track.

In one embodiment of the idler arrangement, the idler wheel support comprises an idler arm turnably connected to the track support beam, said idler arm is turnable around a substantially horizontal axis transverse to the support beam and the idler wheel position adjusting means comprises idler arm angle adjustment means such that an angle $\alpha$ between idler arm and the track support beam is adjustable by the idler arm angle adjustment means. This embodiment further increases the possibility to adjust the tensioning in the endless track depending on the requested torque applied by the sprocket and make it possible to adapt the track assembly to both forward and reverse driving.

In one embodiment of the idler arrangement, the idler arm angle adjustment means are hydraulically or electrically powered and operated by the control unit to make it possible to control the angular position of the idler arm with high accuracy.

In one embodiment of the idler arrangement, the idler arm is resiliently supported and intended to be forced against the ground with a predetermined force. This embodiment ensures that the contact area between the endless track and the ground is large since the resilient support of the idler arm will force the idler wheel in the rear end of the track support beam into contact with the ground. Furthermore, the idler arm will follow the ground structure as the vehicle moves.

In one embodiment of the idler arrangement, the sprocket and the idler wheel position adjusting means are hydraulically powered and a pressure sensor is arranged to determine the pressure in the hydraulic oil supplied to power the sprocket and where the pressure sensor is arranged to transfer the information to the control unit to determine the requested torque applied by the sprocket. This embodiment is favourable since changes in the hydraulic pressure is determined with high accuracy which is essential to ensure a precise adjustment of the idler wheel position.

In one embodiment of the idler arrangement, an increased pressured in the hydraulic oil supplied to the sprocket is detected by the pressure sensor and the control unit is configured to operate the idler wheel position adjusting means such that the idler wheel is maintained in the desired position or moved towards the second end position, and a reduced pressure in the hydraulic oil supplied to power the sprocket moves the idler wheel towards the first end position. This embodiment is favourable when the sprocket wheel is arranged in the front end of the track assembly and the idler wheel is arranged in the rear end of the track assembly.

In one embodiment of the idler arrangement, the sprocket and the idler wheel position adjusting means comprises electrical motors operated by the control unit and said control unit is configured such that an increased requested torque applied by the sprocket activates the electrical motor arranged to move the idler wheel such that the idler wheel is maintained in the desired position or moved towards the second end position, and a reduced requested torque applied by the sprocket moves the idler wheel towards the first end position.

One embodiment of the idler arrangement further comprises means for determining the weight of the load on the vehicle and transfer information about the weight to the control unit such that the tension in the endless track is adjusted depending on the weight of the load on the vehicle. This embodiment further improves the arrangement since the total weight of the vehicle could vary a lot and the possibility to adjust the tension depending on the determined load improves the comfort and reduces the effect on the travelled ground.

One embodiment of the idler arrangement further comprises means for determining an inclination of the ground under the vehicle and transfer the information to the control unit such that the tension in the endless track is adjusted depending on the determined inclination. This embodiment further improves the arrangement since the information about the inclination of the ground is also used as a parameter to control the tension in the endless track.

The invention furthermore to a method for operating the idler arrangement described above to maintain the desired tension in the endless track, said method comprises the steps:

a. determine the requested torque applied by the sprocket; and b. activate the idler wheel position adjusting means to position the idler wheel in the desired position to maintaining the desired tension in the endless track based on the requested torque applied by the sprocket.

In one embodiment of the method, the idler wheel is maintained in the desired position, or moved towards the second end position when the requested torque applied by the sprocket is increased.

In one embodiment of the method, the idler wheel is movable between a first and a second end position, said first end position is arranged closer to the track support beam (31) than the second position and the tension in the endless track is reduced when the idler wheel is moved towards the first end position and increased when the idler wheel is moved towards the second position, wherein the idler wheel is maintained in the desired position or moved towards the first end position when the requested torque applied by the sprocket is reduced.

In one embodiment of the method, the idler arm is turnably connected to the track support beam around a substantially horizontal axis transverse to the track support beam and the control unit is configured to control the position of the idler arm to adapt the angle of the idler arm to the requested torque applied by the sprocket to adjust the tension in the endless track.

In one embodiment of the method, information regarding the weight of the load on the vehicle is determined and transferred to the control unit such that the tension in the endless track is adjusted depending on the weight of the load on the vehicle.

In one embodiment of the method, the information regarding the inclination of the ground under the vehicle is determined and transferred to the control unit such that the tension in the endless track is adjusted depending on the determined inclination of the ground under the vehicle.

In one embodiment of the method, information regarding the requested torque applied by the sprocket is determined by a position of a throttle, a measured pressure in a hydraulic system for powering the sprocket, or a measured power in an electrical system arranged to power the sprocket.

BRIEF DESCRIPTION OF THE DRAWINGS

The invention will be better understood through the following illustrative and non-limiting detailed description of preferred embodiments, with reference to the appended drawings, in which.

All figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
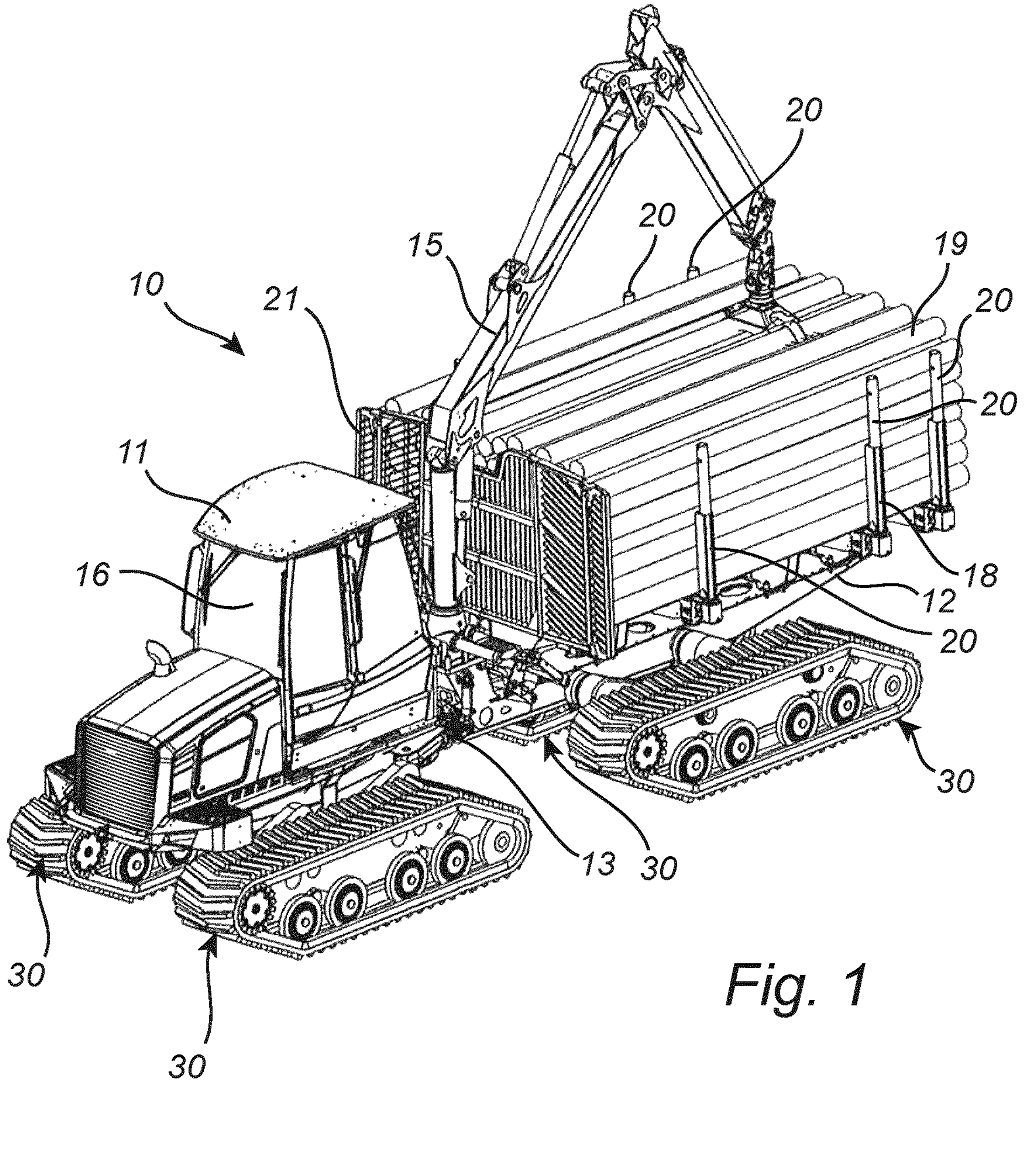
FIG. 1 illustrates a perspective view of a vehicle comprising an idler arrangement according to the invention.

In FIG. 1 a perspective view of an example of a vehicle 10 according to the invention is illustrated. The vehicle is intended for work within forest areas and comprises a front 11 and rear 12 vehicle body unit connected to each other by a pivotable coupling 13 such that the angular position between the front 11 and rear 12 vehicle body unit could be changed to steer the vehicle during use.

Both the front 11 and rear 12 vehicle body unit comprises one track assembly 20 arranged on each side of the vehicle body unit to support the vehicle body unit and power the vehicle during driving. The claimed invention could also be used in vehicles with other configuration like for example with only one vehicle body supported by track assemblies. The four track assemblies have substantially the same configuration even though the dimensions and size of the different parts of the track assemblies could be adapted to the specific needs of the respective vehicle unit.

In the front vehicle body unit 11, a combustion engine, and thereto related systems, are arranged to power the vehicle during driving as well as the different functions within the vehicle such as for example a crane 15 for handling logs etc. The combustion engine is arranged to power a hydraulic system for driving the vehicle and the crane 15 for lifting logs etc. The combustion engine is also arranged to support an electrical system and charging of batteries arranged to ensure power supply to the different functions and systems in the vehicle. The combustion engine could also be replaced by an electrical configuration and a larger battery capacity to power the different functions of the vehicle.

Furthermore, the front vehicle body unit 11 comprises a cabin 16 for one, or more, operators of the vehicle. Within the cabin the required user interfaces for driving the vehicle and the different systems and tools arranged on the vehicle. The cabin is adapted to the intended use of the vehicle and could comprises heating, cooling, seats etc. for the operator comfort.

The rear vehicle body 12 unit of the illustrated vehicle embodiment is adapted for work within the forest area and comprises a load area 18 for logs or alternative loads, and the crane 15 for loading and/or unloading logs 19, or loads, from the vehicle 10. The load area 18 is formed by six log supports 20 each formed by a lower part referred to as a bunk connected to the vehicle chassis and an upper preferably adjustable part referred to as a stake. The supports are arranged along the sides of vehicle body unit 12 to form the load area 18 for logs between the two rows of supports 20. In the front end of the load area 18 a gate 21 is arranged transverse to the longitudinal direction of the load area 18 to provide a front ending of the load area 18. The gate 21 facilitates the loading of logs and prevent that the logs are arranged to close to the crane 15 and the front vehicle body unit 11 which could affect the functionality of the crane and reduce the possibility to manoeuvre the vehicle. The logs are arranged substantially parallel to the longitudinal direction of the vehicle within the load area. The load area could however be modified in different ways to optimize the load area for different purposes and gods. For example, storage of logs transverse to the longitudinal direction of the vehicle, or dividing the load area into two, or more, smaller compartments arranged along the rear vehicle body unit.

Figure 2:
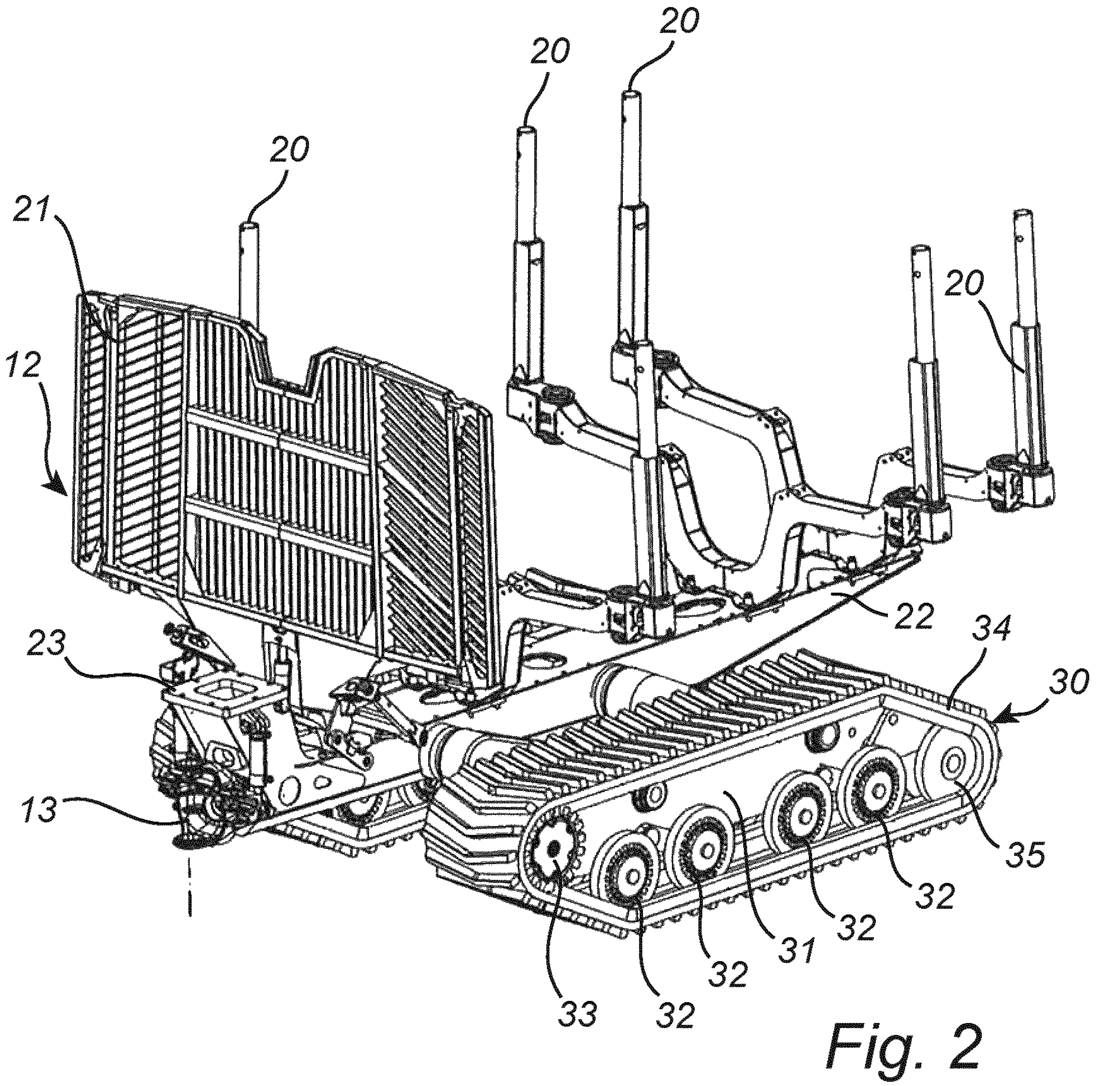
FIG. 2 illustrates a perspective view of a rear vehicle unit and selected parts of a track assembly comprising an idler arrangement according to the invention.
Figure 3:
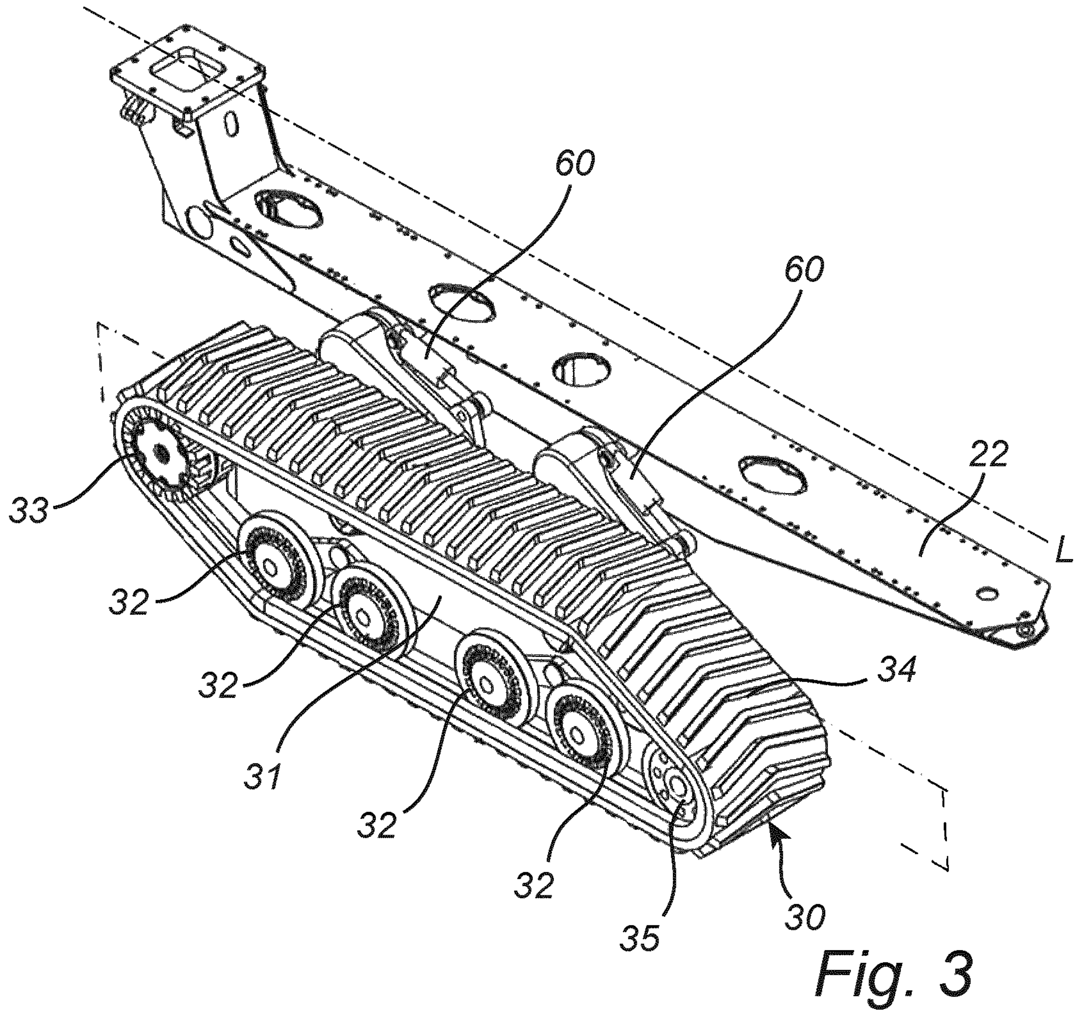
FIG. 3 illustrates selected parts of the vehicle in perspective.

The rear vehicle body unit 12, illustrated more in detail in FIG. 2. comprises an elongated support beam 22 extending from the pivotable coupling 13 all the way to the rear end of the vehicle body unit 12. The elongated support beam 22 is the load bearing structure, i.e. the cassis, that support the different parts and systems within the rear vehicle unit 12 such as for example the crane 15 fitted to a crane post 23 in the front end of the support beam 22.

The vehicle has one track assembly 30 on each side of the respective vehicle body unit. The number of track assemblies could however be increased if a longer rear vehicle body unit is desired. Each track assembly 30 comprises an elongated track support beam 31 extending substantially parallel to the longitudinal direction L of the vehicle body unit. The track support beam 31 is arranged to support a number of track road wheels 32 and at least one sprocket 33 arranged to drive an endless track 34 extending around the track road wheels and the sprocket. The track road wheels 32 are resiliently fitted to the track support beam 31 to provide a smooth interaction with the ground and reduce the impact on the ground. The sprocket 33 is arranged in the front end of the track support beam 31 to drive the endless track 34 and move the vehicle 10 forwards or backwards. The endless track 34 could be embodied in different ways to adapt the track to different characteristics of the ground and the intended driving speed of the vehicle. The endless tracks could be made of a rubber composition or metal elements linked together to form the endless track 34. Furthermore, an idler wheel 35 is arranged to adjust and maintain the desired tension in the endless track 34. The idler wheel is in the illustrated embodiment arranged in the rear end of the track support beam and is described in detail below. In the illustrated embodiment, the track assembly comprises one set of identical sprockets, track road wheels and idler wheel one each side of the track support beam to provide a reliable support of the endless track. However, the track assembly could be modified in several different ways such as alternating the position of the sprocket and the idler wheel and increase or reduce the number of track road wheels.

Each track assembly 30 is fitted to the support beam 22 by a suspension device 40. The suspension device is designed to allow a movement of the track assembly 30 relative to the vehicle body 12 in a substantially vertical plane extending parallel to the longitudinal direction L of the rear vehicle body unit 12 and the track assembly 30 such that the vehicle body could be maintained in a substantially horizontal orientation even though the ground is inclined.

The suspension device 40 for each track assembly 30 comprises a front 41 and a rear 42 movable arm connecting the track assembly 30 to the vehicle body unit. The front 41 and rear 42 arm are turnably connected to the vehicle body support beam 22 and the track assembly beam 31 to allow the track assembly 30 to move in the vertical plane. The front 41 and rear 42 arm are both turnable around axes transverse to the longitudinal direction of the vehicle and the track assembly, illustrated in FIG. 4*b*.

The front arm has an elongated straight arm section 44 intended to extend in a plane substantially parallel to the track assembly 30 plane of movement. In the end of the elongated arm section 44 that is intended to be turnable fitted to the support beam 22 an attachment element 45 is extending in a direction substantially transverse from the arm section 44 towards the support beam 22, and in the opposite end of the arm section 44 a similar attachment element 46 is extending transverse to the arm section 44 towards the track support beam 31. In both the support beam 22 and track support beam 31 the attachment elements 45, 46 are fitted via suitable bearing to provide a reliable and robust fitting for a long period of time.

The rear arm 42 have a similar configuration as the front arm but the elongated arm section 47 is divided into a first 48 and a second arm segment 49 movably connected to each other to make it possible to adjust the length of the elongated arm section 47 by adjusting the position of the two arm segments 48, 49 in relation to each other. The possibility to adjust the length of the arm section 47 is important for the movement of the track assembly 30 in relation to the vehicle body, and necessary to allow the track assembly 30 to move free in the vertical plane to reach angled positions in relation to the vehicle body unit 12. In the end of the first arm segment 48 that is intended to be turnable fitted to the support beam 22 an attachment element 50 is extending in a direction substantially transverse form the first arm segment 48 towards the support beam 22, and in the opposite end of the elongated arm section, i.e. the second arm segment 49, a similar attachment element 51 is extending transverse to the second arm segment 49 towards the track assembly beam 31. In both the support beam 22 and track assembly beam 31 the attachment elements 50, 51 are fitted via suitable bearing to provide a reliable and robust fitting for a long period of time. In an alternative configuration the front arm, or both arms, has an adjustable length to allow the track assembly to move in different angles in relation to the vehicle body. The suspension device 40 furthermore comprises means to hydraulically, or electrically, operate the forward 41 and rear 42 arm to control the position of the track assemblies 30 in the vertical plane in relation to the vehicle body unit 12.

Figure 4A:
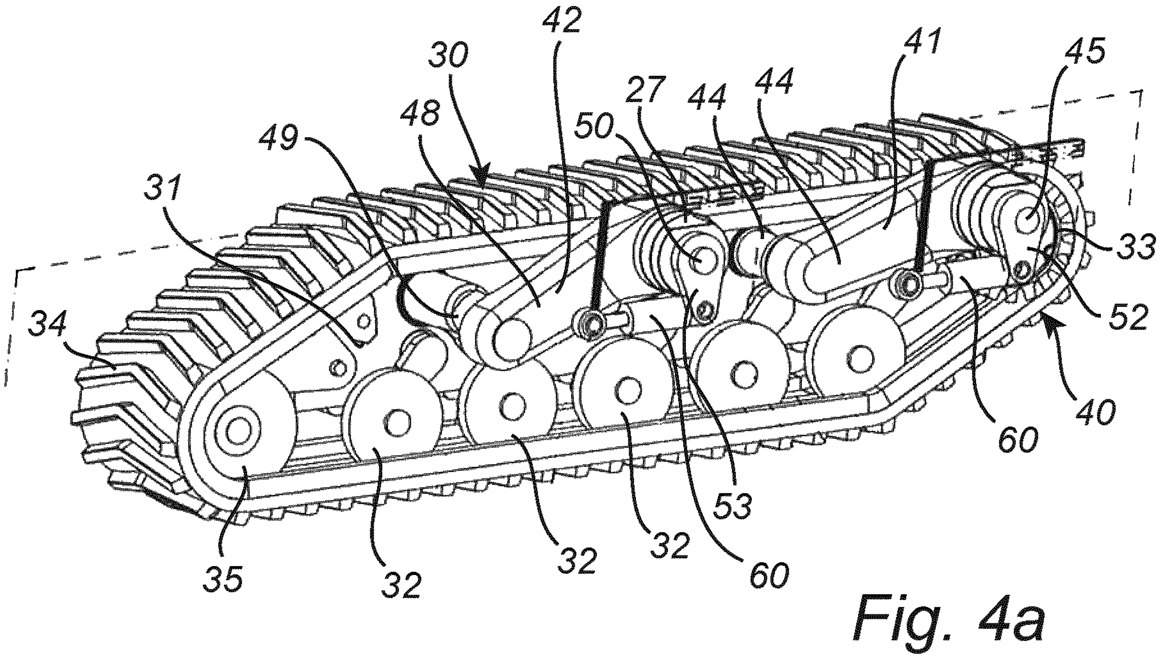
FIG. 4*a* illustrates one of the ground support assemblies and the suspension device in perspective.
Figure 4B:
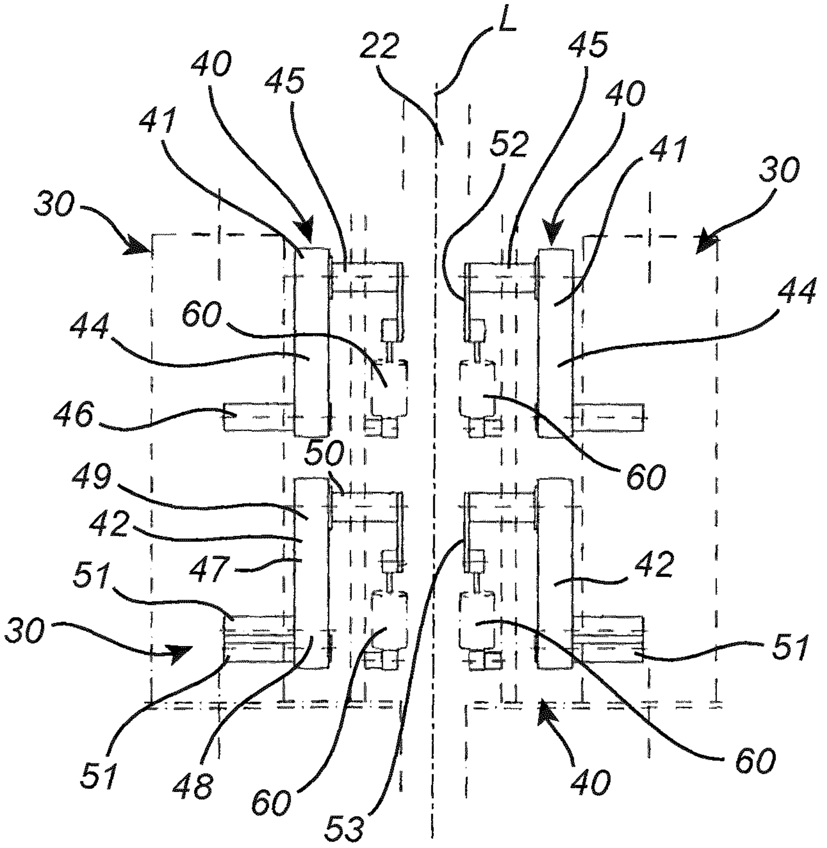
FIG. 4*b* illustrates a schematic illustration of the suspension device.
Figure 5:
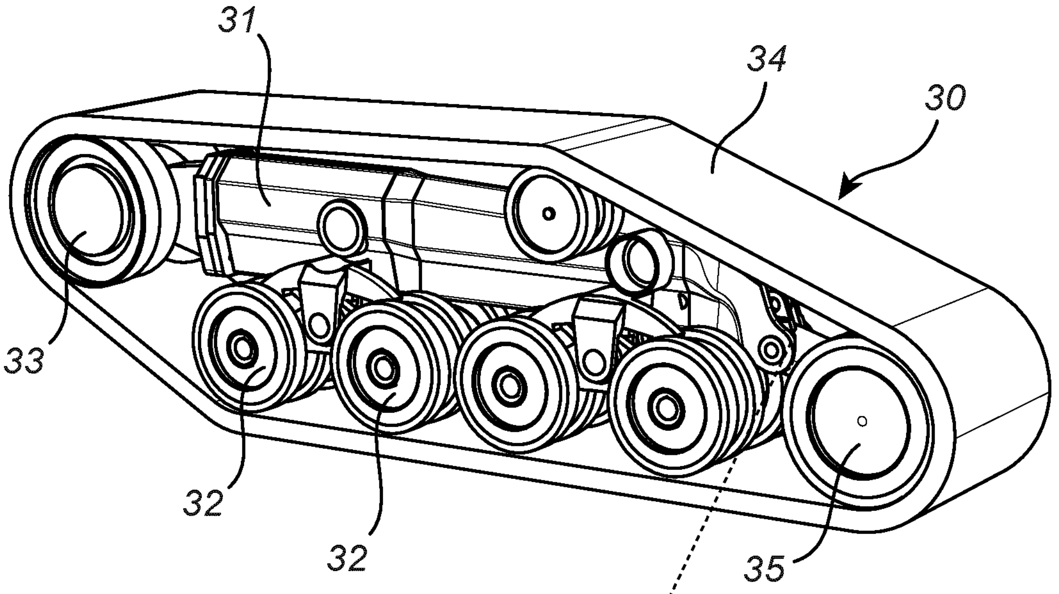
FIG. 5 illustrates a perspective view of a track assembly comprising an idler arrangement according to the invention. and idler arrangement.
Figure 6:
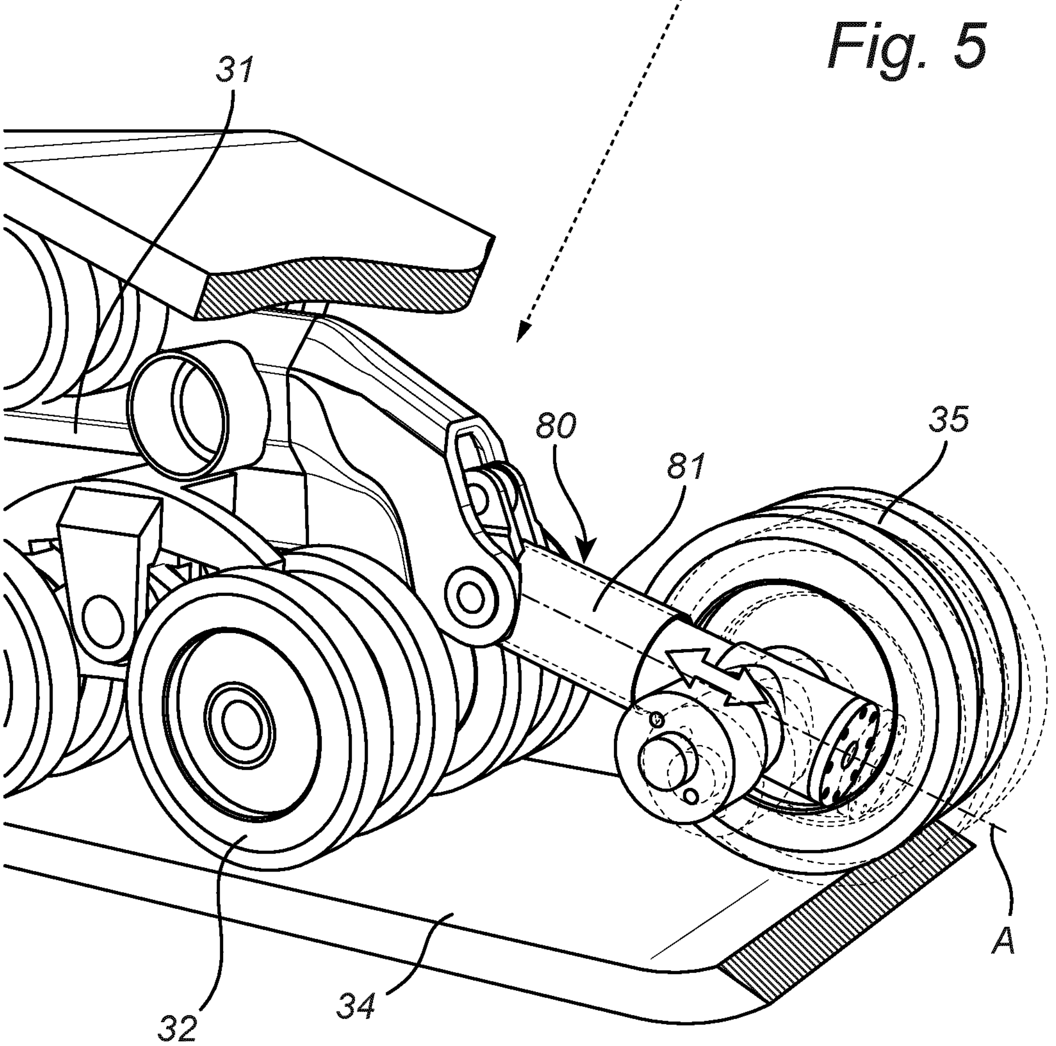
FIG. 6 illustrates a second perspective view of the track assembly and the idler arrangement according to the invention.
Figure 7:
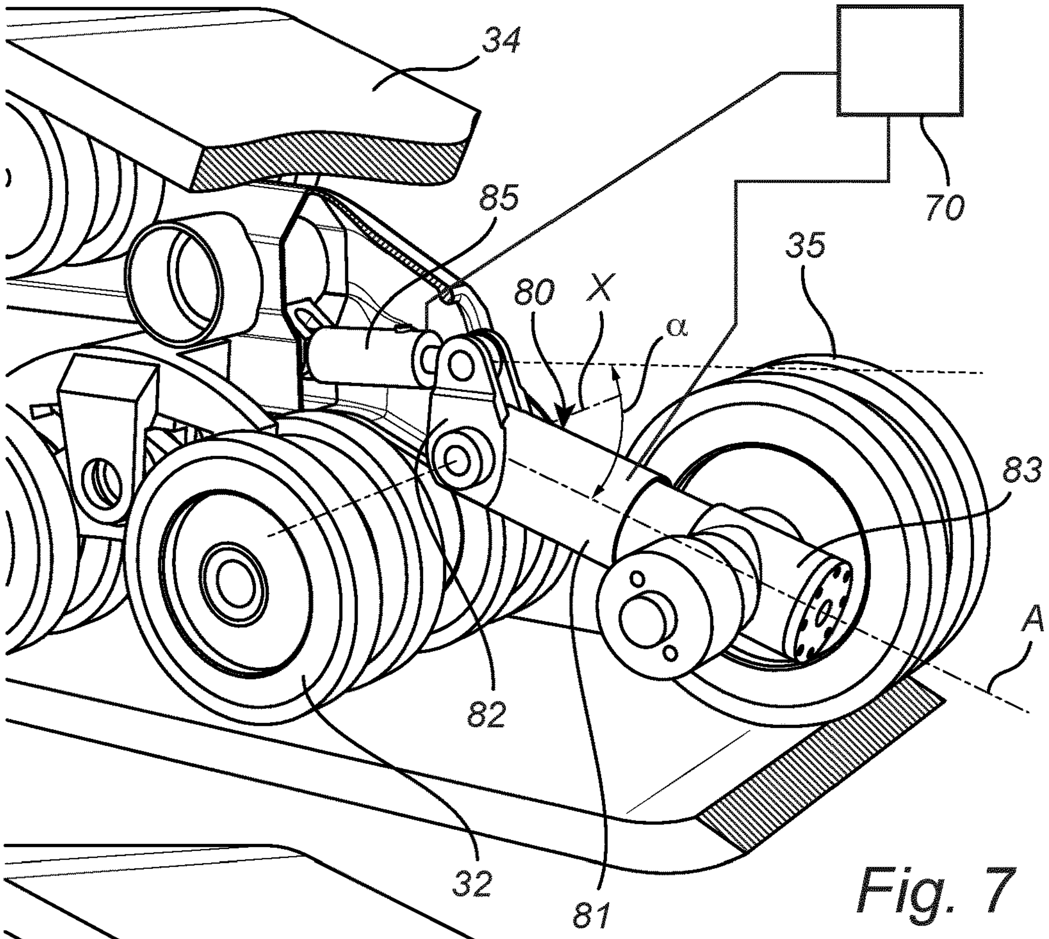
FIG. 7 illustrates a third perspective view of the track assembly and the idler arrangement.
Figure 8:
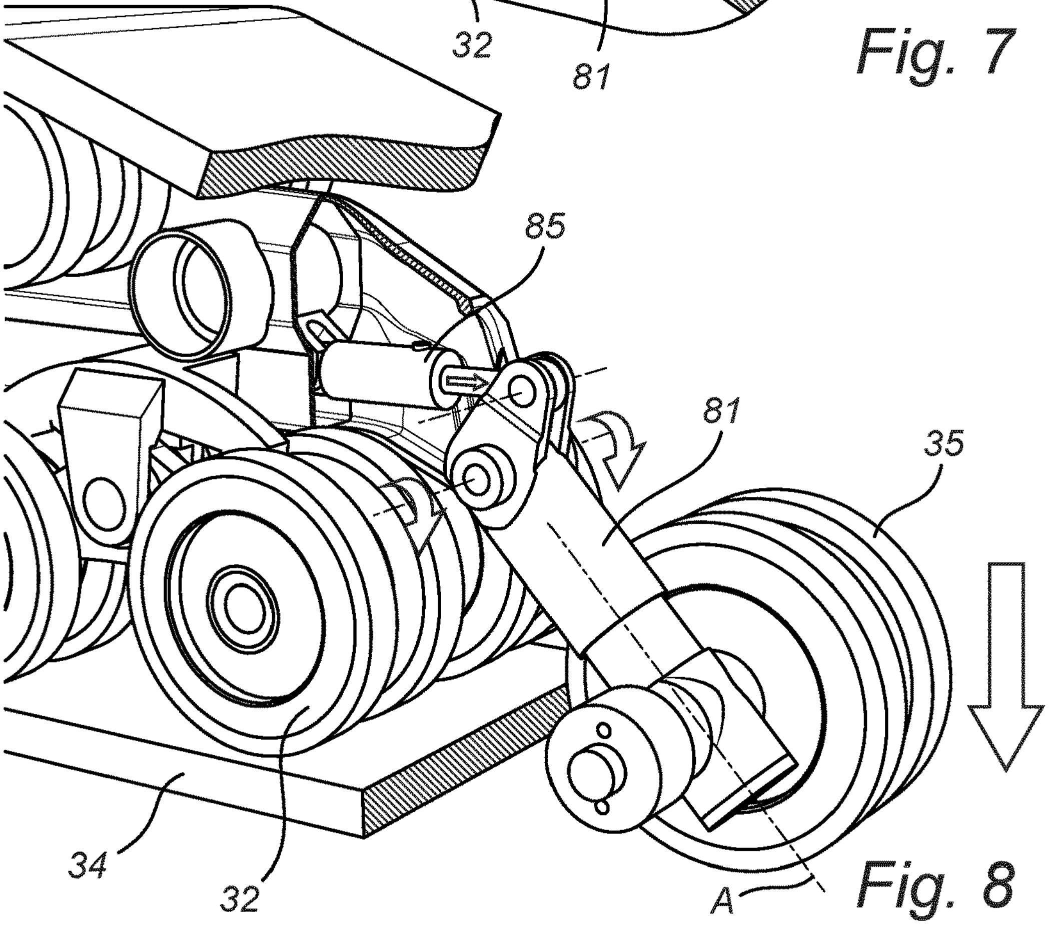
FIG. 8 illustrates a fourth perspective view of the track assembly and the idler arrangement.

In the illustrated embodiment of the vehicle, FIGS. 4*a* and 4*b*, hydraulic cylinders 60 are arranged to control the movement of the front 41 and rear 42 arm. The cylinders are arranged to control the front 41 and rear 42 arm in the area where the arms are connected to the support beam 22 and one end of the hydraulic cylinders 60 is secured to the support beam 22. The moving part of the hydraulic cylinders 60 are connected to the attachment elements 45, 50 that are fitted to the support beam 22 of the rear vehicle body unit 12 via substantially identical coupling elements 52, 53 extending parallel to the longitudinal direction L in order to be able to transfer the momentum from the cylinders required to control the movement of the front 41 and rear 42 arm. Preferably, the suspension device comprises a corresponding arrangement to control the second arm segments 49 position in relation to the first arm segment 48 to provide the desired accurate control of the track assemblies. This arrangement comprises a hydraulic cylinder connected via a coupling element to the attachment element 51 of the second arm segment 50. The suspension device of each track assembly of the vehicle has a similar configuration. The possibility to control the movement of the front 41 and rear 42 arm is essential to make it possible to adapt the position of the track assemblies 30 to the ground conditions, i.e. inclination, to maintain the vehicle body in the desired substantially horizontal position.

The different functions of the vehicle are hydraulically, alternatively electrically powered, to ensure reliable powering of all the different functions of the vehicle. The pressurized hydraulic oil is provided by a combustion engine, alternatively an electrical engine, arranged to drive a compressor arranged to pressurize the hydraulic oil.

The different hydraulic systems, or electrical systems, are controlled by one, or more, control units 70 arranged to control the different functions of the vehicle. The control unit, or units are configured to receive information from different sensors and equipment in the vehicle. Examples of information provided to the control unit is the angular orientation of the vehicle body to determine the inclination of the ground, weight sensors arranged to determine the weight of the load on the vehicle, the speed the vehicle is moving at and the direction the vehicle is moving in. The collected information is used as parameters that could be taken in consideration to optimize the operation of the different functions of the vehicle such as for example an idler arrangement.

Figure 9:
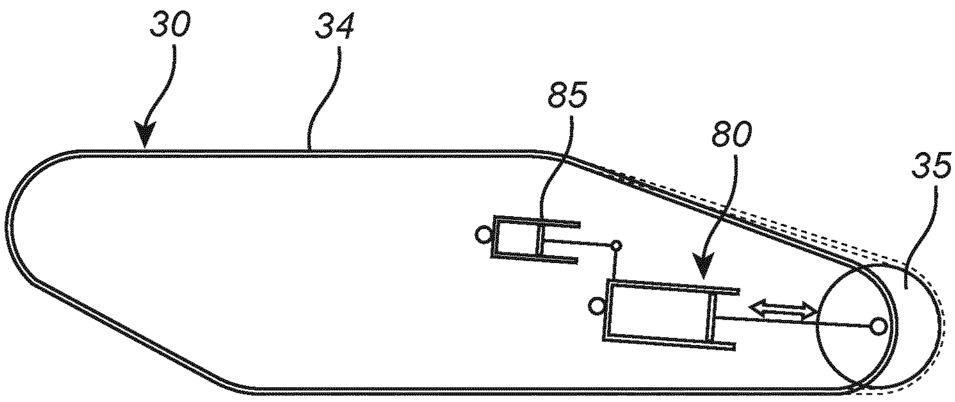
FIG. 9 illustrates a schematic side view of the idler arrangement according to the invention.
Figure 10:
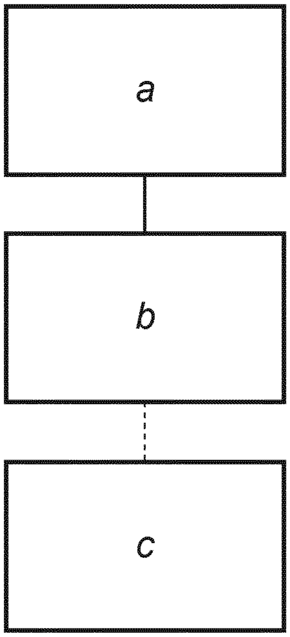
FIG. 10 illustrates a schematic illustration of the method according to the invention.

The idler arrangement according to the invention is one of the functions within the vehicle and is intended for maintaining the desired tension in the endless track 34 of the track assembly 30 to ensure the desired performance of the track assembly 30, and in the end the vehicle. The idler arrangement is illustrated in detail in FIGS. 5 to 8. Furthermore, the idler arrangement and the movement of the idler wheel 35 are schematically illustrated in FIG. 9 to more clearly illustrate the movement of the idler wheel support and the idler wheel.

The idler arrangement 80 comprises an idler wheel support 81, in the illustrated embodiment in the shape of an idler arm, fitted to the rear end of the track support beam 31. The idler arm 81 comprises a first end 82 turnably fitted to the support beam 31 and is extending rearwards from the support beam. The idler wheel support could be embodied in different ways as long as it provides the desired reliable support of the idler wheel 35.

In the second end 83 of the idler arm 81 the idler wheel 35 is rotatably arranged. The idler arm 81 is in the illustrated embodiment substantially straight but could be embodied in other shapes such as for example curved. The first end of the idler wheel support 81, i.e. the idler arm, is turnably connected to the track support beam 31 around a horizontal axis X transverse to the track support beam 31 such that the angle $\alpha$ between the idler arm 81 and the longitudinal axis of the track support beam 31 is adjustable by idler arm angle adjustment means 85. The angle adjustment means 85 could be embodied in different ways such as a hydraulic cylinder or an electrical motor arranged to adjust the angular position of the idler wheel support 81. A first end of the angle adjustment means 85 is fitted to the track support beam while the second end is connected to the idler wheel support. Both the first and the second end of the angle adjustment means 85 are turnable around axes parallel to axis X to ensure the required movement of the different parts.

The idler arm 81 is resiliently arranged in the track assembly 30 such that the idler arm 81, and consequently the idler wheel 35 are forced downwards towards the ground. The spring force is selected by the characteristics of the spring such that the desired force against the ground is achieved. The resilient arrangement is favourable since the contact area of the endless track on the ground preferably is maintained as large as possible to reduce the pressure on the ground.

The angular position of the idler arm 81 is allowed to change within the range of 20° to about −15° in relation to the extension of the track support beam such that the idler wheel could be arranged in positions from below the track road wheels to clearly above the track road wheels for example during reverse driving when a low position of the idler wheel could increase the risk for damages if something is in front of the track assembly. This embodiment is favourable both in combination with a hydraulically or electrically powered idler arm angle adjustment means.

The idler wheel 35 has a peripheral surface intended to co-operate with a corresponding structure in the inside surface of the endless track such that the idler wheel is rotating together with the endless track and maintain the track in the intended position on the idler wheel when the vehicle is moving forwards, or rearwards. In the figures the peripheral surface of the idler wheel is substantially flat but for example undulating structures on the wheel periphery and the inside surface of the endless track could be used to provide additional guidance.

The idler wheel is movably arranged along the idler wheel support, i.e. the idler arm 81. The idler wheel 35 is movable along an axis A between a first and a second end position to make it possible to adjust the tension in the endless track. This movement is illustrated for example in FIG. 9. The distance between the first and second end position is selected depending on the length of the endless track and the required adjustment range for the idler wheel. For the illustrated embodiment of the arrangement the distance is substantially within the range of 100 to 200 mm. The first end position is arranged closer to the track support beam 31 than the second position such that the tension in the endless track is reduced when the idler wheel 35 is moved towards the first end position, and increased when the idler wheel is moved towards the second position. In the illustrated embodiment the axis A is substantially parallel to the longitudinal axis of the idler arm.

The idler wheel 35 is resiliently supported in the idler arm 81 by spring means, not illustrated in the figures, arranged in the idler arm to force the idler wheel towards the second position, i.e. towards the inside surface of the endless track, to ensure the necessary tension in the endless track to maintain the track in the intended position. The tension in the endless track depend on the spring force and is selected depending on the expected needs for the specific track assembly.

The arrangement furthermore makes it possible to the control and adapt the position of the idler wheel by idler wheel position adjusting means arranged to position the idler wheel in the desired position along axis A based on a requested torque applied by the sprocket. The idler wheel position adjusting means could be embodied in different ways such as a hydraulic cylinder arranged within the idler wheel support, i.e. the idler arm 81, alternatively an electrical motor arranged within the idler wheel support, i.e. the idler arm 81 to move the idler wheel.

In the illustrated embodiment of the vehicle many of the different functions such as the track assembly and the idler arrangement are hydraulically powered. The idler arm position means consequently are embodied as a hydraulic cylinder 85 arranged to adjust the angular position of the idler arm, and the idler wheel position adjusting means comprises a hydraulic cylinder arranged in the idler arm and configured to move the idle wheel along axis A, i.e. extend the length of the idler arm to adjust the tension in the endless track.

Furthermore, the angular position of the idler arm could also be used to adjust the tension in the endless track since the angular position of the idler arm will also affect the tension in the endless track.

The idler arrangement according to the invention furthermore comprises means arranged to determine a requested torque applied by the sprocket such that the information about the requested torque applied by the sprocket could be used to immediately activate the idler wheel position adjusting means to adjust the position of the idler wheel along axis A alternatively maintain the position of the idler wheel and maintain the desired tension in the endless track.

For the embodiment described above, an increased requested torque applied by the sprocket to move the vehicle in the forward direction requires that the idler wheel is moved towards the second end position to maintain the desired tension in the part of the endless track in contact with the ground. When the requested torque applied by the sprocket is reduced, the idler wheel could be moved towards the starting position, i.e. the position that the wheel is arranged in when only the spring force is acting on the idler wheel. If the vehicle is operated to move in the rear direction, the position of the idler wheel is adjusted towards the first end position.

One embodiment of the idler arrangement comprises a control unit arranged to receive the information about the requested torque applied by the sprocket and, based on the information about the requested torque, immediately activate the idler wheel position adjusting means to adjust the position of the idler wheel. Information regarding the requested torque applied by the sprocket is for example collected as an electrical signal from the control system of the throttle, or a pressure measured with a pressure sensor in the hydraulic system arranged to power the sprocket. This configuration could be used for both hydraulically or electrically powered track assemblies and idler arrangements.

In an alternative embodiment of the idler arrangement, useful when the track assembly and idler arrangement are hydraulically powered, the pressure in the hydraulic oil arranged to power the drive wheel could be used to activate the hydraulic cylinder arranged to move the idler wheel. This embodiment is favourable since the control systems could be less complex since an increased, or reduced, pressured in the hydraulic oil supplied to power the drive wheel is transferred to the hydraulic cylinder arranged to adjust the position of the idler wheel. An increased pressure moves the idler wheel towards the second end position, and a reduced pressure in the hydraulic oil supplied to power the drive wheel moves the idler wheel towards the first end position.

In a further alternative embodiment of the idler arrangement, the sprocket and the idler wheel position adjusting means comprises electrical motors operated by the control unit. The control unit is configured such when an increased or reduced requested torque applied by the sprocket is determined, the electrical motor arranged to maintain the idler wheel in the desired position or adjust the position of the idler wheel is activated to maintain the desired tension in the endless track.

The invention furthermore relates to a method for operating the idler arrangement described above to maintain the desired tension in the endless track, said method comprises the steps:

determine a requested torque applied by the sprocket;

activate the idler wheel position adjusting means to position the idler wheel in the desired position to maintaining the desired tension in the endless track based on the determined requested torque applied by the sprocket.

One embodiment of the method comprises the step that the idler wheel is maintained in the desired position or moved towards the second end position when the requested torque applied by the sprocket is increased.

One embodiment of the method comprises the step that the idler wheel is maintained in the desired position or moved towards the first end position when the requested torque applied by the sprocket is reduced.

One embodiment of the method comprises the step that the idler arm is turnably connected to the track support beam around a substantially horizontal axis transverse to the track support beam and the control unit is configured to control the position of the idler arm to adapt the angle of the idler arm to the requested torque applied by the sprocket to adjust the tension in the endless track.

While the invention has been illustrated and described in detail in the drawings and foregoing description, such illustration and description are to be considered illustrative or exemplary and not restrictive; the invention is not limited to the disclosed embodiments. The skilled person understands that many modifications, variations and alterations are conceivable within the scope as defined in the appended claims.

Additionally, variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

The invention claimed is:

1. An idler arrangement for maintaining the desired tension in an endless track, said endless track is part of a track assembly comprising a track support beam, track road wheels and at least one sprocket arranged to drive the endless track arranged around the track road wheels and the sprocket, said idler arrangement comprising:

an idler wheel;

an idler wheel support fitted to the track support beam and configured such that the idler wheel is movably arranged in relation to the support beam;

a control unit;

idler wheel position adjusting means operated by the control unit and arranged to position the idler wheel in a desired position: and means for determining an anticipatory requested torque to be applied by the sprocket and forwarding the determined information to the control unit, wherein the control unit is configured to operate the idler wheel position adjusting means to maintain, or adjust, the position of the idler wheel, based on the anticipator requested torque to be applied by the sprocket, to maintain the desired tension in the endless track by activating an adjustment of the idler wheel position before a resulting change in the tension of the endless track occurs;

wherein the sprocket and the idler wheel position adjusting means are hydraulically powered and a pressure sensor is arranged to determine the pressure in the hydraulic oil supplied to power the sprocket and where the pressure sensor is arranged to transfer the information to the control unit to determine the anticipatory requested torque to be applied by the sprocket, or the sprocket and the idler wheel position adjusting means comprises electrical motors operated by the control unit and said control unit is configured such that an increased anticipatory requested torque to be applied by the sprocket activates the electrical motor arranged to move the idler wheel such that the idler wheel is maintained in the desired position or moved towards the second end position, and a reduced anticipatory requested torque to be applied by the sprocket moves the idler wheel towards the first end position, wherein the idler wheel position adjusting means comprises a hydraulic cylinder arranged in the idler wheel support, configured to extend the length of the idler arm to adjust the tension in the endless track, to thereby move the idle wheel along axis A, to adjust the tension in the endless track.

2. The idler arrangement according to claim 1, wherein the idler wheel is movable between a first and a second end position, said first end position is arranged closer to the track support beam than the second position and the tension in the endless track is reduced when the idler wheel is moved towards the first end position and increased when the idler wheel is moved towards the second position.

3. The idler arrangement according to claim 1, wherein the idler wheel is resiliently supported in the idler wheel support.

4. The idler arrangement according to claim 1, wherein the idler wheel support comprises an idler arm turnably connected to the track support beam, said idler arm is turnable around a substantially horizontal axis (X) transverse to the support beam and the idler wheel position adjusting means comprises idler arm angle adjustment means such that an angle a between idler arm and the track support beam is adjustable by the idler arm angle adjustment means.

5. The idler arrangement according to claim 4, wherein the idler arm angle adjustment means are hydraulically or electrically powered and operated by the control unit.

6. The idler arrangement according to claim 5, wherein the idler arm is resiliently supported and intended to be forced against the ground with a predetermined force.

7. The idler arrangement according to claim 1, wherein an increased pressured in the hydraulic oil supplied to the sprocket is detected by the pressure sensor and the control unit configured to operate the idler wheel position adjusting means such that the idler wheel is maintained in the desired position or moved towards the second end position, and a reduced pressure in the hydraulic oil supplied to power the sprocket moves the idler wheel towards the first end position.

8. The idler arrangement according to claim 1, further comprising means for determining the weight of the load on the vehicle and transfer information about the weight to the control unit such that the tension in the endless track is adjusted depending on the weight of the load on the vehicle.

9. The idler arrangement according to claim 1, further comprising means for determining an inclination of the ground under the vehicle and transfer the information to the control unit such that the tension in the endless track is adjusted depending on the determined inclination.

10. A method for operating the idler arrangement according to claim 1 to maintain a desired tension in the endless track, said method comprises the steps:

a) determine the anticipatory requested torque to be applied by the sprocket;

b) activate the idler wheel position adjusting means to position the idler wheel in the desired position to maintaining the desired tension in the endless track based on the anticipatory requested torque to be applied by the sprocket.

11. The method according to claim 10, wherein the idler wheel is movable between a first and a second end position, said first end position is arranged closer to the track support beam than the second position and the tension in the endless track is reduced when the idler wheel is moved towards the first end position and increased when the idler wheel is moved towards the second position, wherein the idler wheel is maintained in the desired position or moved towards the second end position when the requested torque applied by the sprocket is increased.

12. The method according to claim 11, wherein the idler wheel is maintained in the desired position or moved towards the first end position when the requested torque applied by the sprocket is reduced.

13. The method according to claim 10, wherein the idler wheel support comprises an idler arm turnably connected to the track support beam around a substantially horizontal axis (X) transverse to the track support beam and the control unit is configured to control the position of the idler arm to adapt an angle of the idler arm based on the requested torque applied by the sprocket in order to adjust the tension in the endless track.

14. The method according to claim 10, wherein information regarding the weight of the load on the vehicle is determined and transferred to the control unit such that the tension in the endless track is adjusted depending on the weight of the load on the vehicle.

15. The method according to claim 10, wherein information regarding the inclination of the ground under the vehicle is determined and transferred to the control unit such that the tension in the endless track is adjusted depending on the determined inclination of the ground under the vehicle.

16. The method according to claim 10, wherein information regarding the requested torque applied by the sprocket is determined by a throttle, a measured pressure in a hydraulic system for powering the sprocket, or a measured power in an electrical system arranged to power the sprocket.

17. An idler arrangement for maintaining the desired tension in an endless track of a track assembly, comprising:

an idler wheel;

an idler wheel support fitted to a track support beam of the track assembly and configured such that the idler wheel is movably arranged in relation to the track support beam;

an idler wheel position adjusting means arranged to position the idler wheel in a desired position, wherein the idler wheel position adjusting means comprises a hydraulic cylinder arranged in the idler wheel support, configured to extend the length of the idler arm to adjust the tension in the endless track, to thereby move the idle wheel along axis A, to adjust the tension in the endless track; and a control unit configured to maintain a desired tension in the endless track, when arranged around a sprocket and track road wheels of the track assembly, by:

(i) obtaining an anticipatory requested torque to be applied by the sprocket of the track assembly, (ii) operating the idler wheel position adjusting means to move the idler wheel in a direction towards the track support beam when a reduced torque is to be applied by the sprocket, and (iii) operating the idler wheel position adjusting means to maintain the idler wheel in the desired position or to move the idler wheel in a direction away from the track support beam, when an increased torque is to be applied by the sprocket.

* * * * *